US008426827B2

(12) United States Patent
Cahill (10) Patent No.: US 8,426,827 B2
(45) Date of Patent: Apr. 23, 2013

(54) AUTOMATIC GAIN STABILIZATION AND TEMPERATURE COMPENSATION FOR ORGANIC AND/OR PLASTIC SCINTILLATION DEVICES

(75) Inventor: Bonaventure Cahill, Crestview Hills, KY (US)

(73) Assignee: VEGA Grieshaber KG, Schiltach (DE)

( * ) Notice: Subject to any disclaimer, the term of this patent is extended or adjusted under 35 U.S.C. 154(b) by 340 days.

(21) Appl. No.: 12/703,305

(22) Filed: Feb. 10, 2010

(65) Prior Publication Data
US 2011/0192979 A1 Aug. 11, 2011

(51) Int. Cl.
*G01T 1/20* (2006.01)
(52) U.S. Cl.
USPC ...................... 250/370.11; 250/368
(58) Field of Classification Search ............. 250/370.11, 250/368
See application file for complete search history.

(56) References Cited

U.S. PATENT DOCUMENTS

| | | | |
|---|---|---|---|
| 3,473,021 A | 10/1969 | Elliott et al. | |
| 3,884,288 A | 5/1975 | Berry | |
| 4,481,595 A | 11/1984 | Schiessl et al. | |
| 4,651,800 A | 3/1987 | Kollberg | |
| 4,735,253 A | 4/1988 | Vaterlaus | |
| 4,739,819 A | 4/1988 | Eriksson et al. | |
| 4,918,314 A * | 4/1990 | Sonne | 250/369 |
| 5,218,202 A * | 6/1993 | Evers | 250/252.1 |
| 5,564,487 A | 10/1996 | Cahill et al. | |
| 5,866,907 A * | 2/1999 | Drukier et al. | 250/366 |
| 6,087,656 A * | 7/2000 | Kimmich et al. | 250/252.1 |

FOREIGN PATENT DOCUMENTS

| | | |
|---|---|---|
| DE | 41 14 030 C1 | 9/1992 |
| EP | 0 125 024 A1 | 11/1984 |
| EP | 0 189 645 A1 | 8/1986 |
| WO | 2007/046012 A3 | 4/2007 |
| WO | WO 2007046012 A2 * | 4/2007 |

OTHER PUBLICATIONS

B. Machaj, Automatic Gain Control Circuit for Scintillation Probe with Plastic Scintillator, Article, Jul. 18, 1973, 5 pages, Nuclear Instruments and Methods 118 (1974) 231-235; North-Holland Publishing Co., Warsaw, Poland.
International Search Report; PCT/US2011/024040, Mailed Dec. 20, 2011.
Scherbatskoy SA, Stabilized Scintillation Counter, The Review of Scientific Instructions, vol. 32, No. 5, May 1, 1961, p. 599.

* cited by examiner

*Primary Examiner* — David Porta
*Assistant Examiner* — Hugh H Maupin
(74) *Attorney, Agent, or Firm* — Wood, Herron & Evans, LLP (57) ABSTRACT

A detector and associated method are provided including a first scintillation material having a light yield temperature dependence and an output at a first energy level, a second scintillation material having a light yield temperature dependence similar to the first material and an output at a second energy level, and detection circuitry. The first and second outputs are responsive to radiation emitted from an ionizing radiation source. The detection circuitry includes a photo multiplier tube configured to convert photon outputs from the first and second scintillating materials to electrical pulses, a counter circuit configured to count the electrical pulses generated in the photo multiplier tube by the first and second materials, and a gain control circuit configured to monitor the electrical pulses generated in the photomultiplier tube by the second material and adjust a gain of the detector upon detecting a drift in the output of the second material.

20 Claims, 5 Drawing Sheets

AUTOMATIC GAIN STABILIZATION AND TEMPERATURE COMPENSATION FOR ORGANIC AND/OR PLASTIC SCINTILLATION DEVICES

FIELD OF THE INVENTION

The present invention relates generally to radiation measurement devices, and more particularly to a method for automatic gain stabilization and temperature compensation in such devices.

BACKGROUND OF THE INVENTION

In typical nuclear measurements devices, the nuclear detector is based on scintillating material. Scintillating materials produce light when exposed to nuclear radiation. The amount of light produced is related to the amount of ionizing radiation impinging on the scintillating material. In the case of gamma radiation, the spectrum of light produced is dependent on whether the energy is dissipated via Compton scattering or the photo electric absorption effect. Scintillation materials with an atomic number less than 25 are primarily subject to Compton scattering, while scintillation materials with atomic numbers greater than 25 are subject to Compton scattering and photo-electric absorption. Compton scattering produces a broad spectrum of light and there is generally no distinguishable characteristics or photo peaks. Conversely, the photo-electric effect produces a distinguishable photo peak, based on the energy of the absorbed gamma radiation.

Light is detected through the use of a Photo Multiplier Tube ("PMT"), which converts incoming photons to electric current pulses. A PMT coupled to an end of the scintillating material detects light emanating from the scintillating material. The PMT produces a signal indicative of the amount of radiation impinging on the material, which is representative of a particular measurement of the device. This type of sensor is discussed in U.S. Pat. Nos. 3,884,288, 4,481,595, 4,651,800, 4,735,253, 4,739,819, and 5,564,487, the entireties of which are incorporated by reference herein. Other nuclear radiation detection technologies have also been used in nuclear type detectors, e.g., a Geiger tube is shown in U.S. Pat. No. 3,473,021, the entirety of which is incorporated by reference herein. There are also scintillating detectors that make use of two different scintillating materials known as Phoswich detectors. A Phoswich ("phosphor sandwich") is a combination of scintillators with dissimilar pulse shape characteristics optically coupled to each other and to a common PMT (or PMTs). Pulse shape analysis distinguishes the signals from the two scintillators, identifying in which scintillator an event occurred.

Unfortunately, there are several disadvantages with conventional ionizing radiation measurement devices, particularly those devices using scintillating material as a radiation detector. The gain of the PMT shifts with temperature and, in general, the light yield of the scintillation material usually changes with temperature as well. Other factors such as dark current pulses may be issues, but the primary disadvantage of a scintillation device is temperature related.

In the case of high atomic number (Z) scintillators that exhibit photopeaks, like NaI, methods to compensate for temperature effecting the PMT gain and scintillator light yield change due to temperature and based on tracking shifts in the photopeak spectrum are well known and readily available. However in the case of low Z, organic and/or plastic scintillation detectors, photopeaks, if present, are not distinguishable. Therefore temperature compensation and/or auto gain stabilization, based on the photopeak detection methods used for NaI scintillation, is not applicable to plastic or organic scintillation devices.

Plastic and organic scintillating materials generally have a relatively stable light yield over a temperature range from −60° C. to 40° C. However, the PMT gain shift over temperature is still enough of an issue to mandate temperature compensation. This temperature drift due to temperature changes may affect the gain by as much as one half of one percent per degree Celsius.

Contemporary methods of temperature compensation used to null these gain shifts are generally open loop, using a function that approximates light yield versus temperature and PMT gain versus temperature. Adjustments to the PMT gain are made based on this function. For example, a temperature reading may be taken and the electronic and/or high voltage gain may then be adjusted based on that reading. Additionally, other contemporary methods of temperature compensation may consist of shining a light emitting diode (LED) down the scintillating material. In an ideal temperature situation, a percentage of the light from the LED is detected on the other side of the scintillating object. As the temperature increases, however, less light is detected. A measurement is taken of the amount of the LED's light that was detected, and a compensation adjustment may then be made to the gain.

Therefore, there is a need in the art for a better methodology for gain control of the PMT based on the temperature dependence of both the PMT and scintillating materials.

SUMMARY OF THE INVENTION

Embodiments of the invention provide a detector including a first scintillation material having a light yield temperature dependence and an output responsive to radiation emitted from an ionizing radiation source, a second scintillation material having a light yield temperature dependence similar to the first scintillation material and an output responsive to radiation emitted from the ionizing radiation source, and detection circuitry. The output of the first scintillation material is at a first energy level and the output of the second scintillation material is at a second energy level greater than the first energy level. The detection circuitry includes a photo multiplier tube configured to convert photon outputs from the first and second scintillating materials to electrical pulses, a counter circuit configured to count the electrical pulses generated in the photo multiplier tube by the first scintillation material, and a gain control circuit. The gain control circuit is configured to monitor the electrical pulses generated in the same photomultiplier tube by the second scintillation material and adjust a gain of the detector upon detecting a drift in the output of the second scintillation material.

In some embodiments, the second scintillation material may be embedded in the first scintillation material. In other embodiments, the second scintillation material may be adjacent to the first scintillation material. In some of these embodiments, the outputs of the first and second scintillation material may be transmitted through a light guide to the common PMT. In still other embodiments, the second scintillation material may be between the first scintillation material and the photo multiplier tube and the output of the first scintillation material is directed through the second scintillation material. Further embodiments may include first and second scintillation materials that are not in contact with one another and the outputs from the first and second scintillation materials are directed through light guides onto the same PMT.

In some embodiments, the first scintillation material may be a plastic scintillation material and the second scintillation material may be an inorganic scintillation material. In particular embodiments, the inorganic scintillation material may be YSO, YAP, LSO, or LYSO. Additionally, in some embodiments, the second energy level may be higher than the first energy level.

Embodiments of the invention also provide a method of controlling gain of a detector. Radiation is emitted from an ionizing radiation, or radioactive source. A first output is generated responsive to the emitted radiation received by a first scintillation material having a light yield temperature dependence. The first output is at a first energy level. Concurrently, a second output is generated responsive to the emitted radiation received by a second scintillation material having a light yield temperature dependence similar to the first scintillation material. The second output is at a second energy level different and greater than the first energy level. A number of electrical pulses is determined that are associated with both the first and the second outputs. A gain adjustment of the detector may then be determined from the output of the second output.

In some embodiments, determining the number of electrical pulses associated with the first output includes converting the first output to a series of electrical pulses and counting the electrical pulses. In some embodiments, determining the gain adjustment of the detector from the second output includes identifying a photo peak or spectral characteristic in the second output, tracking a drift in the photo peak or spectral characteristic due to a change in temperature, and adjusting the gain of the detector to compensate for the drift due to the change in temperature.

In some embodiments, the second output may also be responsive to a naturally occurring source of high energy beta and gamma ionizing radiation when the second scintillation material is a compound of Lutetium, such as LYSO, or LSO.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

[1] The source of the data curves for NaI(TI), CsI(Na), CsI(TI), and BGO can be found in FIG. 3.3 at http://www.scionix.nl/crystals.htm (last accessed 9 Feb. 2010).

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Inexpensive plastic scintillators are popular because they may easily be machined into practically any shape, including fibers, bars, etc. Furthermore, the advance of technology in the production of robust and reliable photomultiplier tubes assists in making application of scintillation detectors for measurements in difficult environmental conditions a more attractive alternative. However, scintillation probes are known to be very unstable without gain control. To cope with stability problems, an automatic gain control circuit may be used to assist in achieving acceptable stability of measurements. This may be especially important when continuous on-line measurements are to be carried out in difficult environmental conditions, where, e.g., a wide range of temperature changes may occur.

Plastic scintillators, such as polystyrene for example, are inexpensive and are easy to form into bars, fibers, or other configurations. Unfortunately, these plastic scintillators do not produce any recognizable peaks or spectral distributions, which could be tracked to assist in determining how to adjust the gain in the automatic gain control. In addition to the variation in the scintillator, the plastic scintillators are coupled to photomultiplier tubes, which also exhibit variations due to temperature.

Figure 1:
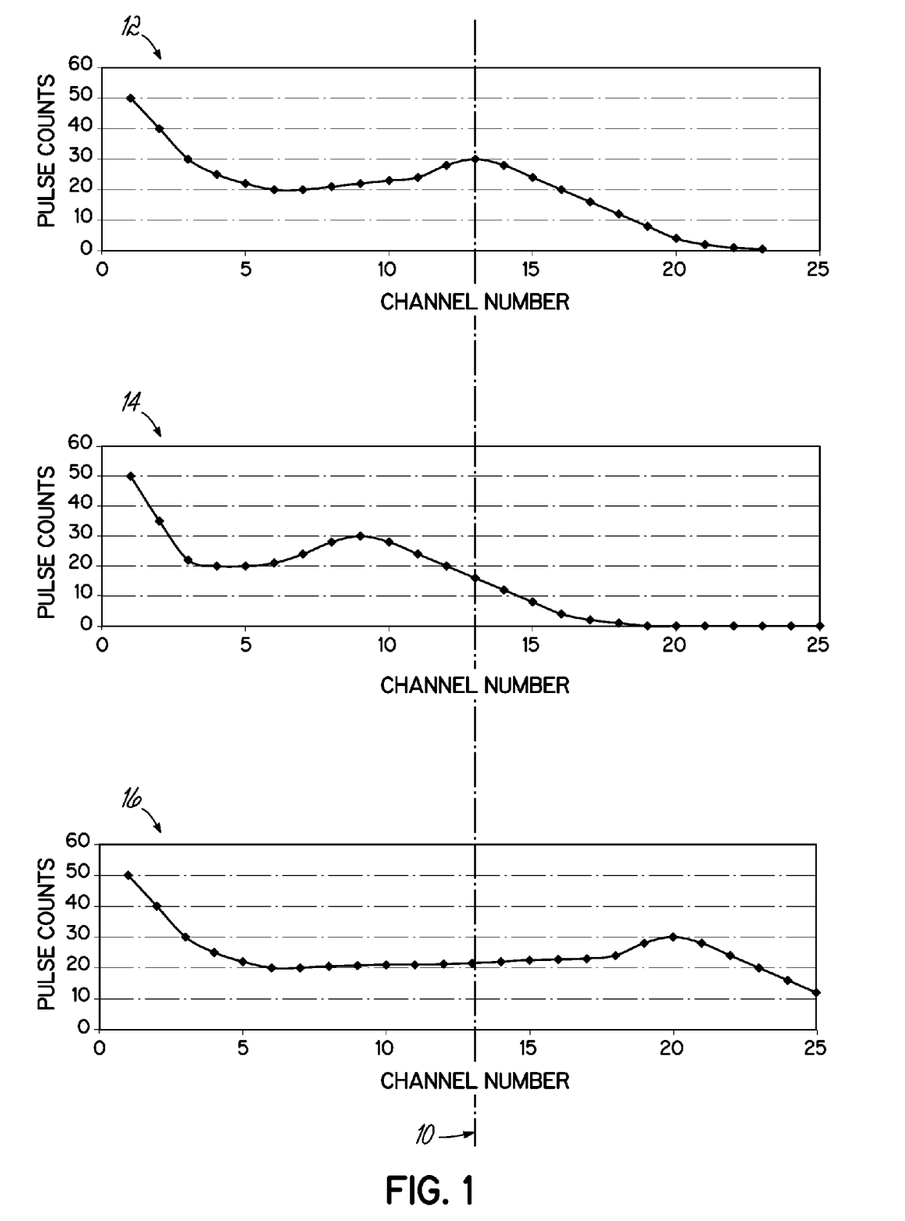
FIG. 1 illustrates three examples of the relationship between pulse counts and channel number at different temperatures.

For example, FIG. 1 illustrates an effect of temperature on the pulse counts in a scintillation probe for a specific channel number of the probe without gain control. Three examples of this relationship are shown. The "pulse counts" are the number of pulses per unit of time and the "channel number" on the graphs is the location of the gain measurement. To illustrate the effects of temperature, the channel number 10 is illustrated in FIG. 1 as the dashed line through each of the graphs. The first graph 12 shows the relationship under ideal conditions, with the channel number 10 selected being based on the reference gain level. As temperature increases, as illustrated in the graph 14, the reference gain shifts away from the channel number 10. Similarly, as illustrated in the graph 16, as the temperature decreases, the reference gain shifts away from the channel number 10. If only channel number 10 is being monitored, the channel number 10 produces an unrealistic pulse count, as the reference has moved away from the channel.

To assist in adjusting the gain, embodiments of the invention utilize a second scintillation material that may be added to the plastic scintillator (bar, fiber or liquid) in order to provide a means of tracking any drift due to temperature or other variation and assist in stabilizing the detector. The second scintillating material may be a number of different materials. For example, the second scintillator may be another plastic, though this scintillator should have at least approximately 1.5 to 2 times the light output and have some measurable energy peak that can be tracked. Alternatively, the second scintillator may be an inorganic scintillator capable of providing a photo peak of the radiation to be used for gain control, and similar to above, the photo peaks should be at least approximately 1.5 to 2 times the light output of the plastic material so that they are separate and distinct from the first scintillation material.

Generally, plastic scintillators operate from approximately −60° C. to approximately +50° C. with less than a 1% change in light yield due to temperature of the plastic itself. The second scintillating material should have a similar light yield dependency on temperature as the plastic scintillator used in detection. Since plastics are non-hygroscopic, the second scintillating material may also be non-hygroscopic, though hygroscopic materials may be used in other embodiments.

Figure 2:
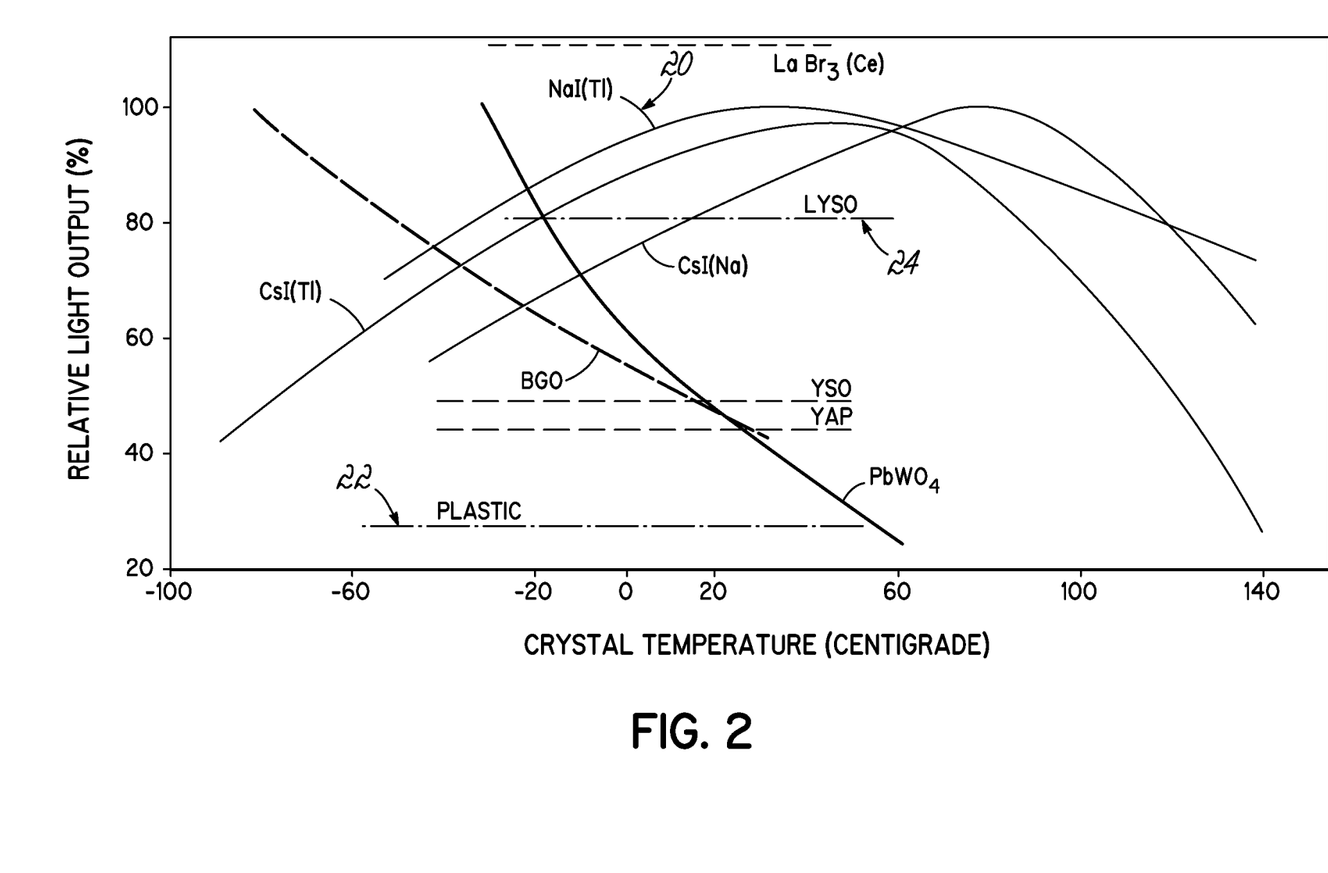
FIG. 2 illustrates the relationship between the percent of relative light output and the temperature of the scintillating crystal[1].

When selecting a material for the second scintillator, NaI would appear be a good candidate because of its superior light yield. However, the light yield temperature dependency of NaI 20, as well as CsI, BGO, and PbWSO$_4$ as seen in FIG. 2 actually makes it a less suitable alternative when compared to other inorganic scintillator materials having little or no light yield temperature dependency as also seen in FIG. 2. Alternatively, materials like Yttrium Oxyortho Silicate ("YSO"), Yttrium Aluminum Perovskit ("YAP"), Lutetium Oxyortho Silicate ("LSO"), Lutetium-Yttrium Oxyortho Silicate ("LYSO"), and other high light yield inorganic scintillators like LaBr(Ce), which have a considerable lower light yield temperature dependency than NaI, may be better suited for the gain control methodology. For example, all these scintillators have less than approximately one percent change in light yield over a wide operating temperature range, approximately −20° C. to approximately 50° C. Other potential materials for the second scintillator may also include GSO, LGSO, LI, LF, LaCl$_3$, WAG, and SrI.

FIG. 2 further illustrates the relationships between a percent of relative light output and a temperature of the scintillating crystals. Particularly, this figure additionally illustrates the relationship between the plastic scintillation material 22 and LYSO 24. As can be seen in FIG. 2, LYSO 24 has a much higher relative light output than the plastic scintillation material 22. Also, the light outputs of both LYSO 24 and plastic 22 remain relatively constant as the temperatures changes.

Because the above inorganic scintillators are materials possessing a high Z element (atomic numbers greater than 25), they generally provide distinct photo peaks, and thus they are well suited to provide the spectral characteristics appropriate for automatic gain stabilization. The effect of combining the spectral characteristics of an inorganic scintillator with the spectral characteristics of a plastic scintillator provides a means for precise, accurate automatic gain control, typically only found with NaI detectors. This methodology may be applied or used with all types of plastic detectors, including fibers, bar types, and liquids. This means of gain control is dependent on the light yield from the inorganic scintillator being greater (for example, approximately 1.5 to 2 times greater) than that from the plastic scintillator and the light yield dependence on temperature being essentially the same for both the plastic and inorganic scintillator. The photo peaks of the inorganic materials, being out of the energy range of the plastic scintillator, may then be used to track the shifts as seen in FIG. 1 and used to adjust the gain accordingly.

In other embodiments, the second scintillating material, e.g. LYSO, may not provide usable photo peaks, but rather, provide a reference or stable spectral output outside of the energy range of the plastic scintillator. This output, like the photo peaks described above, may be tracked and then used to account for any shifts in the scintillation probe, adjusting gain appropriately.

Figure 3:
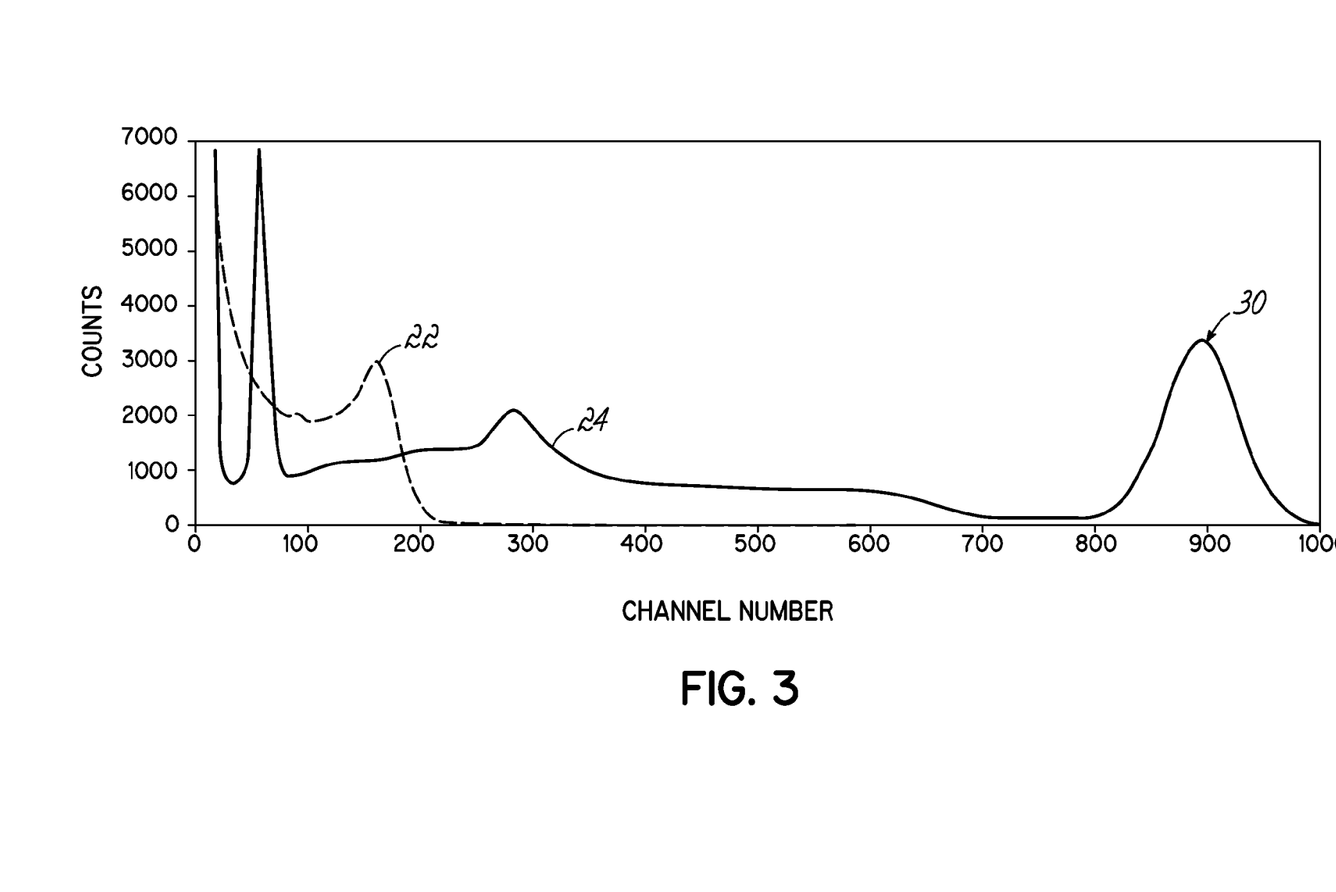
FIG. 3 illustrates the photo peak of a scintillating material that absorbs energy via the photoelectric effect.

FIG. 3 illustrates the relationship of the pulse counts and the channel numbers of two types of scintillating materials. A first scintillating material, such as plastic 22, absorbs energy via Compton scattering. The second scintillating material, such as LYSO 24, absorbs energy via the Compton scattering and photoelectric effect. It should be noted that the photo peak 30 of the second scintillating material 24 is a great distance away from any relevant peaks of the first scintillating material 22. This assists in locating the photo peak of the second scintillating material as well as avoiding any interference with the first scintillating material. Once this photo peak has been located, gain adjustments for temperature may be made. Because of the similarity in temperature dependence between the first and second scintillating materials, any adjustments made to account for drift in the system for the second scintillating material automatically corrects for the drift in the first scintillating material.

The amount of the second scintillating material 24 used for gain control needs to be sufficient enough to be able to locate and measure a photo peak or other energy peak in order to track shifts. However, it is not necessary to have amounts of the second scintillating material 24 similar to that of the plastic scintillating material 22 from which photons are important for counting. In general, the second scintillator material is very small in size compared to the first scintillation material.

Figure 4A:
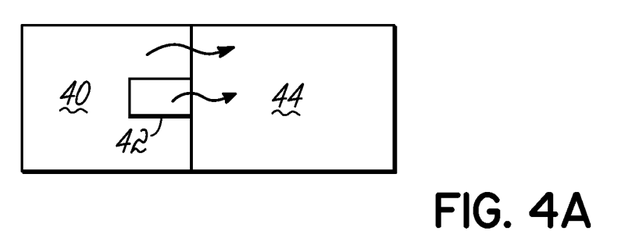
FIGS. 4A-4E illustrate a plurality of potential configurations and relationships between a first scintillating material, a second scintillating material, and photomultiplier tube.

Turning now to FIG. 4A, the first scintillating material 40 may be in a crystal form, for example, and the second scintillating material 42 may be embedded in the first scintillating material 40. Both the first and second scintillating materials 40, 42 transmit photons into the same PMT 44. The amount of the second scintillating material 42 that is embedded in the first scintillating material 40 should be sufficient to be able to produce an energy or photo peak which is capable of being tracked.

Figure 4B:
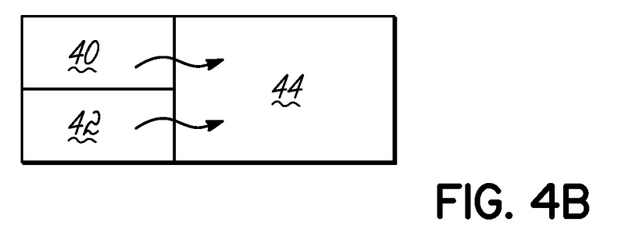

In an alternate embodiment, as seen in FIG. 4B, the first scintillating material 40 may be in the form of fibers in a bundle, for example, and the second scintillating material 42 may be one of the fibers in the bundle. The first and second scintillating materials 40, 42 may then be coupled again to the same PMT 44 as discussed above with the photons produced by the first scintillating material 40 being transmitted through the fibers of the first scintillating material 40 and the photons of the second scintillating material 42 being transmitted through the fiber(s) of the second scintillating material 42. In the fiber bundle arrangement, the number of fibers of the first scintillating material 40 will likely greatly outnumber the number of fibers of the second scintillating material 42 since the number of photons in the second scintillating material 42 is not as important. The number of fibers of the second scintillating material 42 should be sufficient, however, to be able to produce an energy or photo peak which is able to be tracked. In alternate embodiments, the second scintillating material may be only a portion of the fiber at or near the end of a fiber. Alternatively, in FIG. 4B, the first and second scintillating materials 40, 42 may also be in a different form such a bar, for example, with the first scintillating bar adjacent to the second scintillating bar.

Figure 4C:
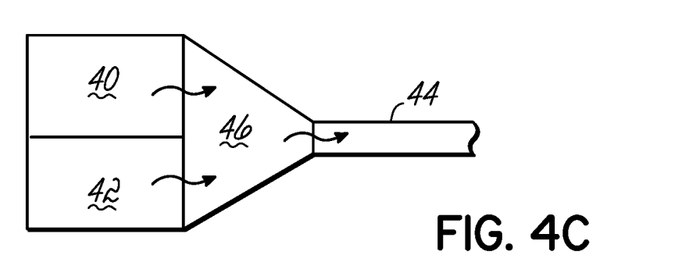

FIG. 4C shows an alternate embodiment where the scintillating materials 40, 42 are in a similar configuration to that of FIG. 4B, where for example, the scintillating materials may be fibers or in bar form. FIG. 4C shows an intervening light guide 46 between the first and second scintillating materials 40, 42 and the PMT 44. The light guide 46 transmits the photons from the first and second scintillating materials 40, 42 to the same PMT 44 allowing the PMT 44 to have a smaller input than the overall area of the terminating ends of the first and second scintillating materials 40, 42, but still allowing both scintillating materials to be coupled directly to the PMT 44.

Figure 4D:
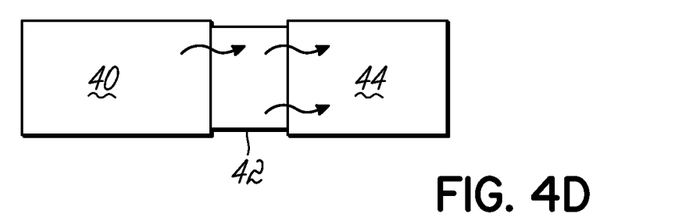

In another embodiment illustrated in FIG. 4D, the second scintillating material 42 may be placed between the first scintillating material 40 and the PMT 44. In this embodiment, photons generated in the first scintillating material 40 are transmitted through the second scintillating material 42 to the PMT 44. The amount of the intervening second scintillating material 42 should be sufficient to be able to produce an energy or photo peak which is capable of being tracked. Additionally, the second scintillating material should be sufficiently transparent to be able to allow the transmission of photons from the first scintillating material 40 through the second scintillating material 42 to the common PMT 44.

Figure 4E:
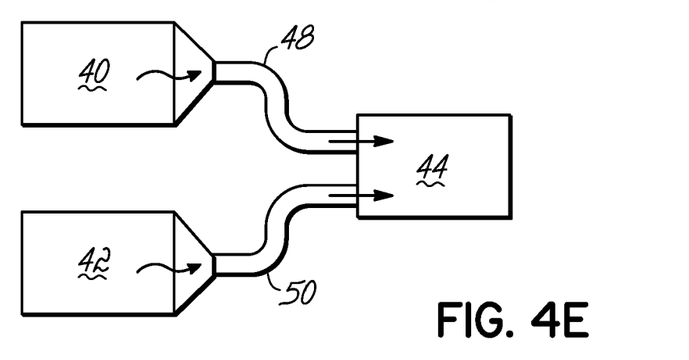

FIG. 4E illustrates still another embodiment where the first and second scintillating materials 40, 42 are not in a contacting relationship. Photon outputs from the first and second scintillating materials 40, 42 may be directed to the same PMT 44 through light guides 48 and 50 respectively. In alternative configurations of this embodiment, one of the first or second scintillating materials 40, 42 may be directly connected to the same PMT 44 while the other of the scintillating materials 40, 42 may be connected through a light guide as illustrated in FIG. 4E. This configuration may be well suited for remote sensor installations achieving gain control by using a second scintillating material as set forth above.

Figure 5:
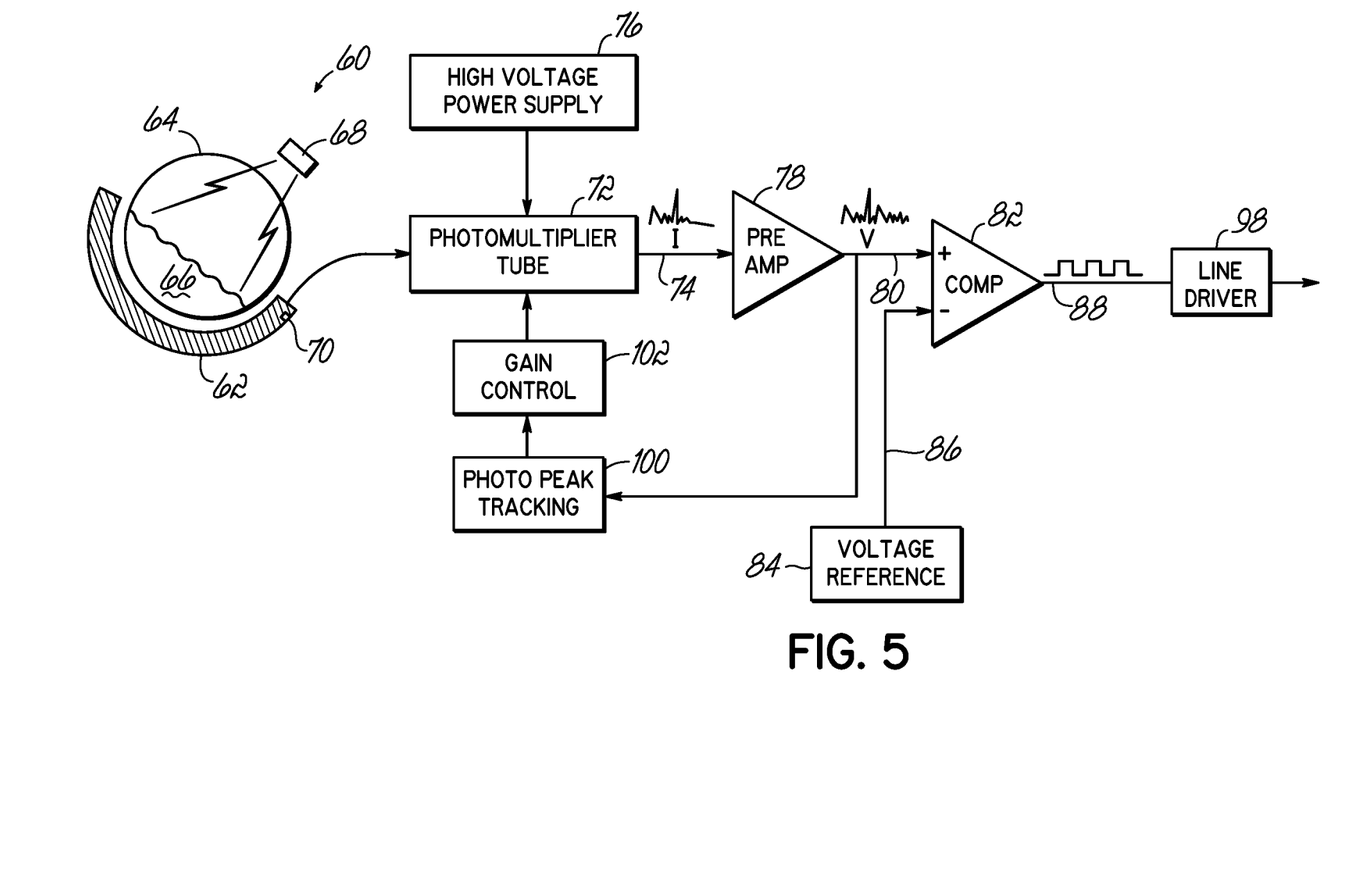
FIG. 5 illustrates an exemplary nuclear level-sensing gauge using a scintillating plastic fiber bundle, and corresponding electronic elements for detecting scintillating light generated by the fiber bundle consistent with embodiments of the invention.

Turning now to FIG. 5, the automatic gain adjustment methodology set forth above may be implemented, for example, in a nuclear level sensing gauge 60. The nuclear level sensing gauge 60 may include a bundle 62 of optical fibers arranged about the periphery of a process vessel 64 filled with product 66 to be level-sensed. A source 68 of nuclear radiation irradiates the product in the vessel. The plastic scintillation detector 62 in this example may be in the form of scintillating fibers, although any other type of plastic or organic scintillation could be used instead. Plastic and/or organic scintillation material may exist in gaseous, liquid or solid form.

A second scintillation material 70 with thermal characteristics similar to those of the plastic scintillation fibers may also be used in embodiments of the invention for gain control consistent with the embodiments set forth above. One possible location for the second scintillating material 70 is shown though alternate locations of the second scintillating material are also contemplated as set forth above, for example, with the embodiments in FIGS. 4A-4E. The second scintillating material 70 may be much smaller than the first scintillating material in most embodiments. As set forth in the methodology above, the second scintillation material may also have a much higher light yield so as to be out of the range of the plastic scintillators or any other scintillation material used that does not have a defined photo peak.

The ends of the scintillating fibers in bundle 62 are generally coupled directly into a photomultiplier tube ("PMT") 72. The PMT 72 utilizes a high voltage of approximately 1,000 Volts DC, for example, which is provided by a high voltage power supply 76. A current output from the PMT 72 in the illustrated example in FIG. 5 is delivered to a preamplifier circuit 78 for converting a current output on signal line 74 to a voltage output on signal line 80. The preamplifier 78 may utilize an ultralow distortion, wide bandwidth voltage feedback operational amplifier in some embodiments to capture the 50-100 nanosecond pulses produced by the scintillation fibers 62.

The output of preamplifier circuit 78 on signal line 80 is fed to a noninverting input of an ultra fast precision comparator 82. The inverting input of the comparator may be connected to a reference voltage 84 on signal line 86. In addition to counting pulses produced from the scintillator fibers 62, an energy level at which a photo peak of the second scintillating material 70 occurs may also be tracked 100. The output of comparator 82 on signal line 88 may be fed to a line driver 98.

In use, the portion of emitted radiation from source 68 that passes through the product 66 impinges upon the scintillating fiber bundle 62, which responds by producing scintillating light. Scintillating light photons produced in bundle 62 are carried along the individual fibers due to near-total internal reflection characteristics of the fibers, and impinged upon the PMT 72 where these photons are amplified and converted to a current waveform on signal line 74. The resulting current waveform is characterized by randomly distributed spikes of various heights, each corresponding to a light impulse produced by radiation impinging upon the fiber bundle 62.

Preamplifier 78 converts this current waveform to a voltage waveform on signal line 80, which has distributed spikes of various heights, each corresponding to the spikes in the current waveform on signal line 74. Comparator 82 compares these voltage spikes to a threshold established by reference 84 to generate a digital pulse train. Each digital pulse reflects a spike in the voltage waveform above the threshold. The digital pulses may then be used to determine, in this instance, the level of material 66 in the vessel. Additionally, photo peaks for additional spikes above a second energy level or a second light output level resulting from scintillating light photons of the second scintillator 70 may be measured and tracked 100. A gain control 102 of the PMT 72 may then adjust the gain of the PMT 72 accordingly to account for any drift within the system.

While the present invention has been illustrated by a description of one or more embodiments thereof and while these embodiments have been described in considerable detail, they are not intended to restrict or in any way limit the scope of the appended claims to such detail. Moreover, while the automatic gain control methodology has been shown in a level measurement application, this method is equally applicable to density measurements, radioactivity detection, weight measurements, etc. Furthermore, the methodology is not limited to plastic or organic scintillators. The methodology applies to any scintillating material without a detectable photo-peak or any other distinguishable spectral characteristic, being used with a second scintillating material that provides a different and greater energy level, where the two scintillating materials have at least the same temperature characteristics across an operating range. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A detector, comprising:
    a first scintillation material having a light yield temperature dependence and an output responsive to radiation emitted from an ionizing radiation source, the output of the first scintillation material being at a first energy level;
    a second scintillation material having a light yield temperature dependence similar to the first scintillation material and an output responsive to radiation emitted from an ionizing radiation source, the output of the second scintillation material being at a second energy level different than the first energy level; and
    detection circuitry including:
        a photo multiplier tube configured to convert photon outputs from the first and second scintillating materials to electrical pulses;

a counter circuit configured to count the electrical pulses generated in the photo multiplier tube by the first and second scintillation materials; and a gain control circuit configured to monitor the electrical pulses generated in the photomultiplier tube by the second scintillation material that exceed those of the first scintillation material and further configured to adjust a gain of the detector upon detecting a drift in the output of the second scintillation material.

2. The detector of claim 1, wherein the second scintillation material is embedded in the first scintillation material.

3. The detector of claim 1, wherein the second scintillation material is adjacent to the first scintillation material.

4. The detector of claim 3, wherein the outputs of the first and second scintillation material are transmitted through a light guide.

5. The detector of claim 1, wherein the second scintillation material is between the first scintillation material and the photo multiplier tube and the output of the first scintillation material is directed through the second scintillation material.

6. The detector of claim 1, wherein the first and second scintillation materials are not in contact with one another and the outputs from the first and second scintillation materials are directed through light guides.

7. The detector of claim 1, wherein the first scintillation material is one of a plastic scintillation material and an organic scintillation material.

8. The detector of claim 1, wherein the second scintillation material is an inorganic scintillation material having a scintillation light yield greater than that of the first scintillation material.

9. The detector of claim 8, wherein the inorganic scintillation material is selected from a group consisting of: YSO, YAP, LSO, and LYSO.

10. The detector of claim 1, wherein the second scintillation material contains elements selected from a group consisting of: GSO, LGSO, LI, LF, $LaCl_3$, WAG, SrI, and combinations thereof.

11. The detector of claim 1, wherein the second energy level is greater than the first energy level.

12. The detector of claim 1, wherein the photo multiplier tube has an input that is common to both the output of the first scintillation material and the output of the second scintillation material.

13. A method of controlling gain of a detector:
emitting radiation from an ionizing radiation source;
generating a first output responsive to the emitted radiation received by a first scintillation material having a light yield temperature dependence, the first output being at a first energy level;
concurrently generating a second output responsive to the emitted radiation received by a second scintillation material having a light yield temperature dependence similar to the first scintillation material, the second output being at a second energy level different than the first energy level;
determining a number of electrical pulses associated with the first output; and
determining a gain adjustment of the detector from the second output.

14. The method of claim 13, wherein determining the number of electrical pulses associated with the first output comprises:
converting the first output to a series of electrical pulses; and
counting the electrical pulses.

15. The method of claim 13, wherein determining the gain adjustment of the detector from the second output comprises:
identifying a distinguishable spectral characteristic in the second output;
tracking a change in the distinguishable spectral characteristic due to a change in temperature; and
adjusting the gain of the detector to compensate for the change in the distinguishable spectral characteristic due to the change in temperature.

16. The method of claim 15, wherein the distinguishable spectral characteristic is a photo peak.

17. The method of claim 15, wherein the distinguishable spectral characteristic is an operating energy range.

18. The method of claim 13, wherein the second output is responsive to a naturally occurring source of radiation from Lutetium.

19. The method of claim 13, wherein the second energy level is greater than the first energy level.

20. The method of claim 13, where the second output is responsive to a naturally occurring source of radiation, and is formed by discriminating against, or subtracting any pulses from, any other radiation sources, including the ionizing radiation source.

* * * * *